United States Patent [19]

Nakatomi et al.

[11] Patent Number: 4,958,067
[45] Date of Patent: Sep. 18, 1990

[54] METHOD AND APPARATUS FOR OPTICALLY DETECTING THE LOCATION OF A CONTROL OBJECT IN A CONTROL PANEL RECESS

[75] Inventors: Yoshiyuki Nakatomi; Toshirou Iwasa; Hitoshi Kobayashi, all of Iwaki, Japan

[73] Assignee: Alpine Electronics Inc., Tokyo, Japan

[21] Appl. No.: 280,766

[22] Filed: Dec. 6, 1988

[30] Foreign Application Priority Data

Jan. 25, 1988 [JP] Japan .................................. 63-7784
May 18, 1988 [JP] Japan ................................ 63-65466

[51] Int. Cl.⁵ ............................................. G01V 9/04
[52] U.S. Cl. ................................ 250/221; 250/227.31
[58] Field of Search ................... 250/221, 222.1, 208, 250/209, 227.31; 340/507, 555, 556, 557, 365 P, 365 R; 356/244, 440

[56] References Cited

U.S. PATENT DOCUMENTS

| | | | |
|---|---|---|---|
| 3,861,792 | 1/1975 | Donati | 250/221 |
| 4,292,467 | 9/1981 | Odlen et al. | 179/1 |
| 4,511,904 | 4/1985 | Takahashi | 250/222.1 |
| 4,692,609 | 9/1987 | Pettersson | 250/221 |
| 4,695,827 | 9/1987 | Beining et al. | 250/221 |
| 4,739,160 | 4/1988 | Kawabe et al. | 250/222.1 |

Primary Examiner—David C. Nelms
Attorney, Agent, or Firm—Guy W. Shoup; David H. Carroll

[57] ABSTRACT

An optical operating device is provided on an operation panel of an audio system or the like, including a recess formed on the operation panel; several light receiving portions are formed on a first inside surface of the recess and arranged in a longitudinl direction of the recess; several light emitting portions are formed on a second inside surface of the recess opposed to the first inside surface, with each light emitting portion corresponding to a light receiving portion. Several light paths thus pass from the light emitting portions across the recess to the light receiving portions, and the light paths are arranged in the longitudinal direction of the recess. A light source supplies the light to each light emitting portion, and a photo detector is connected to the light receiving portions for generating a predetermined signal according to the light emitted from the light emitting portions and received by the light receiving portions. With this arrangement, tone control or the like in the audio system is easily carried out by inserting a finger into the recess and moving the finger to a desired position.

16 Claims, 9 Drawing Sheets

METHOD AND APPARATUS FOR OPTICALLY DETECTING THE LOCATION OF A CONTROL OBJECT IN A CONTROL PANEL RECESS

BACKGROUND OF THE INVENTION

The present invention relates to an optical operating device for an audio system or the like, and more particularly to a structure of an operating section for tone control, volume control and balance control in an on-vehicle audio system such as a tape player, compact disc player and digital audio tape player, or for various control devices in any other electronic equipment.

In the tape player, for example, an operation panel is provided with operating sections for tone control, volume control and balance control. Conventionally, the operating sections are normally of a sliding type and a rotary type.

However, these types of operating sections are of a mechanical type such that mechanical parts are operated by two fingers, for example, rendering the operation troublesome.

SUMMARY OF THE INVENTION

It is an object of the present invention to provide an optical operating device for an audio system or the like which eliminates mechanical operational parts to achieve precise control of a desired level by a simple operation.

According to the present invention, there is provided an optical operating device to be provided on an operation panel of an audio system or the like, comprising a recess formed on the operation panel; a plurality of light receiving portions formed on a first inside surface of the recess and arranged in a longitudinal direction of the recess; a plurality of light emitting portions formed on a second inside surface of the recess opposed to the first inside surface, each light emitting portion located opposite to a corresponding one of each of the light receiving portions to emit light to each opposite light receiving portion; a plurality of light paths passing from the light emitting portions across the recess to the light receiving portions, said light paths being arranged in the longitudinal direction of the recess; at least one light source for supplying the light to each light emitting portion; and at least one photo detector connected to the light receiving portions for generating a predetermined signal in response to the light emitted from the light emitting portions and received by the light receiving portions.

In another aspect of present invention, the optical operating device further comprises a light emission control means for controlling the light source so as to intermittently generate the light.

In operation, when a finger or the like is inserted into the recess, and is moved to a desired position, the light path at this position is blocked by the finger or the like. Accordingly, the light does not reach the corresponding photo detector. Various output levels of tone and volume are present in accordance with the positions of the light paths. Therefore, the blocking of the light is detected by the photo detector to enable control of a desired tone level or volume level, for example, without any problems in operation. Furthermore, the light to be emitted from the light source is controlled by the light emission control means to generate the light intermittently which is in turn intermittently received by the photo detector. It is determined whether or not the predetermined pulse signal is received by the photo detector, and according to the result of determination, the output levels of tone and volume are controlled to obtain a desired level. That is, similar to ON-OFF control of a switch, the desired level may be precisely obtained. Moreover, since no mechanical operational parts are provided, the control operation may be made stable to increase the life of the control device.

Other objects and features of the invention will be more fully understood from following detailed description and appended claims when taken with the accompanying drawings.

DETAILED DESCRIPTION OF THE PREFERRED EMBODIMENTS

The following describes several embodiments of the present invention applied to a tape player with reference to the drawings.

Figure 1:
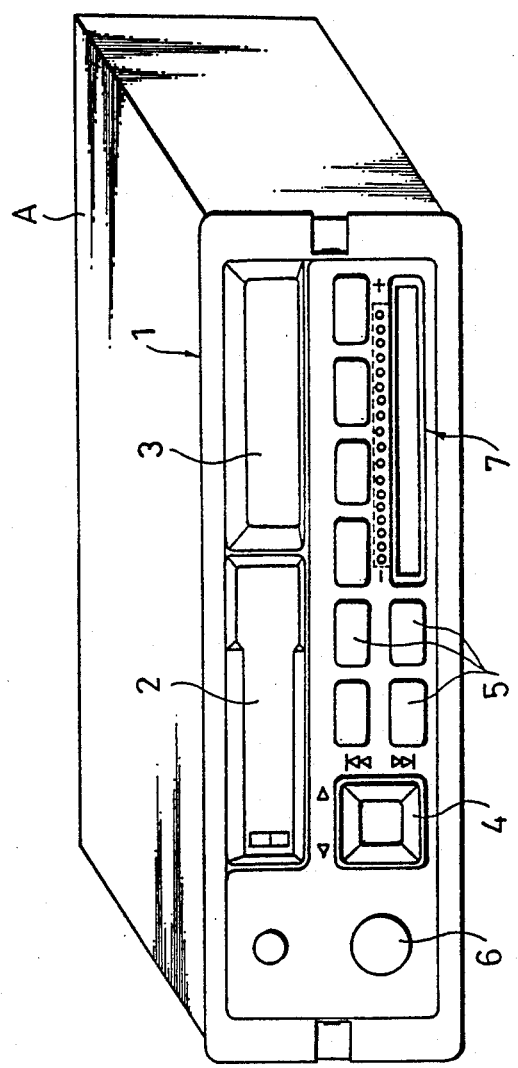
FIG. 1 is a general perspective view of the operation panel in a first preferred embodiment of the present invention.

Referring to FIG. 1 which shows a first embodiment of the present invention, reference numeral 1 generally designates an operation panel mounted on a front surface of a player body A. The operation panel 1 is provided with a cassette insert opening 2, a display 3, various operation buttons 4 and 5, a switch/volume dial 6, and a tone control operating section 7. The tone control operating section 7 constitutes a part of a tone control device to be shown in FIGS. 2 to 6.

Figure 9:
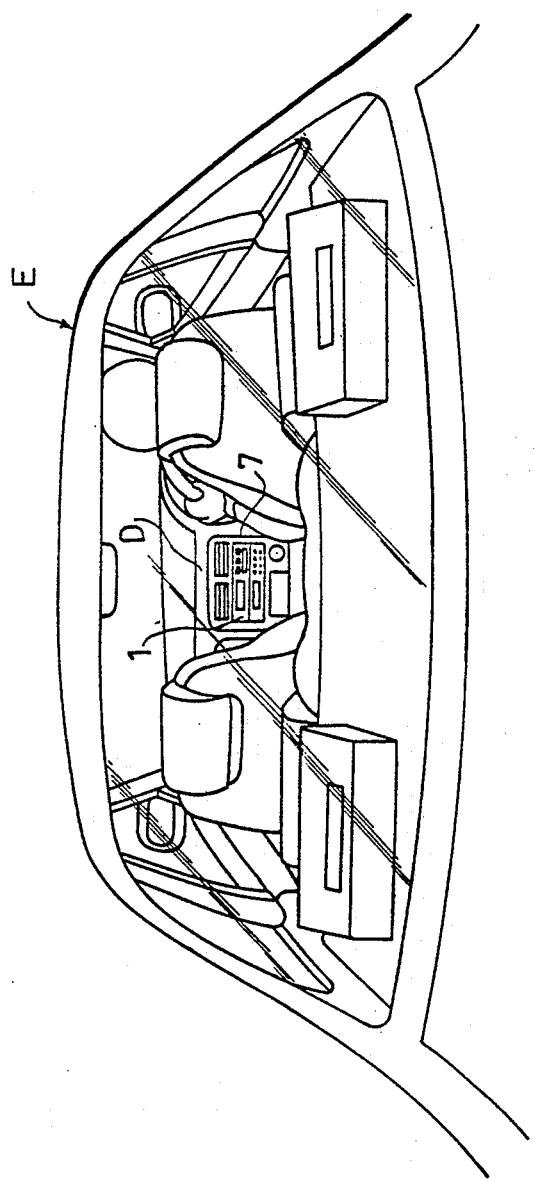
FIG. 9 is a schematic illustration of the arrangement of a tape player having the tone control operating section of the present invention.

Such a tape player is usually mounted in a dash board D of a vehicle E (See FIG. 9) in such a manner that only the operation panel 1 projects frontwardly. Accordingly, ambient light is irradiated to the operation panel 1 from the upper side thereof.

Figure 2:
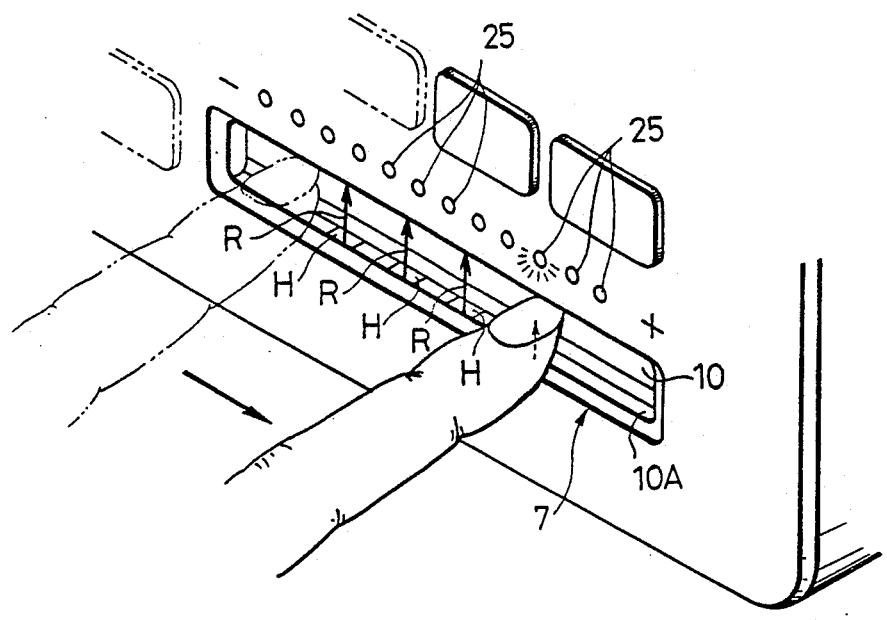
FIG. 2 is a perspective view of a tone control operating section of the operation panel shown in FIG. 1.
Figure 3:
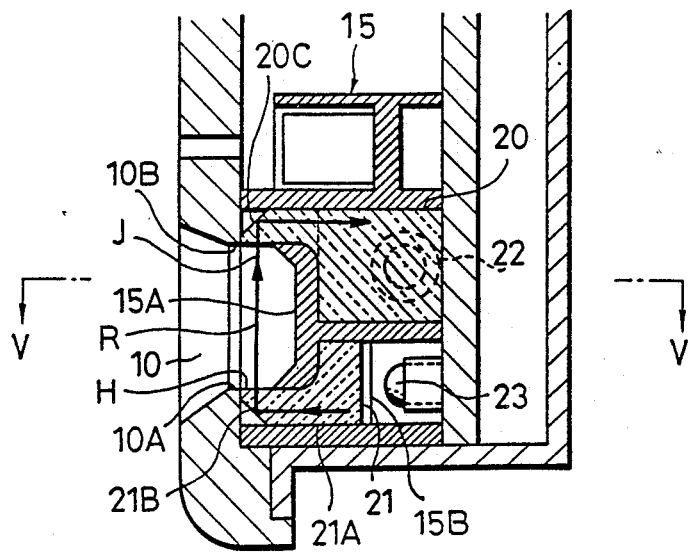
FIG. 3 is a sectional view of the tone control operating section shown in FIG. 2.
Figure 4:
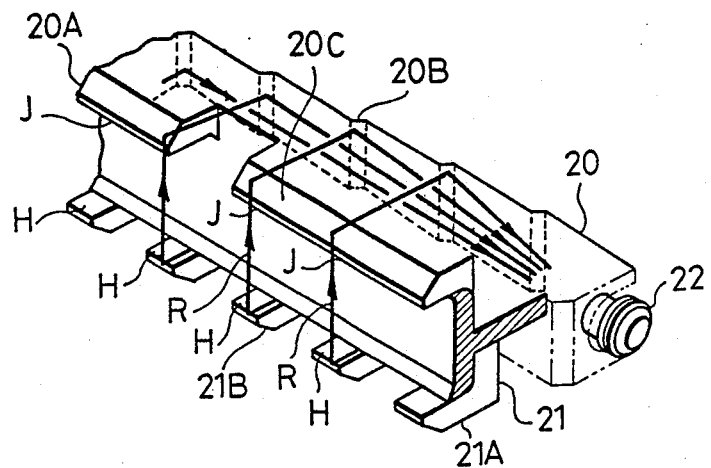
FIG. 4 is a perspective view of a part of the light emitting portions and the light receiving portions in the tone control operating section shown in FIG. 2.

Referring to FIGS. 2 and 3, the tone control operating section 7 is provided with a horizontal straight recess 10. The recess 10 has a lower inside surface 10A provided with a plurality of light emitting portions H arranged in equally spaced relationship to each other in the longitudinal direction of the recess 10. Further, the recess 10 has an upper inside surface 10B provided with a plurality of light receiving portions J for receiving light beams emitted from the light emitting portions H. As best shown in FIG. 4, each light receiving portion J is opposed to each light emitting portion H. Thus, a plurality of light paths R passing from the light emitting portions H across the recess 10 to the light receiving portions J are formed in equally spaced relationship to each other in the longitudinal direction of the recess 10. Accordingly, although the ambient light is irradiated to the operation panel 1 from the upper side thereof, it is difficult for the ambient light to directly enter the light receiving portions J.

As shown in FIG. 3, an integral base 15 formed of resin is provided on the back side of the operation panel 1. The base 15 has a front light shielding wall 15A constituting a bottom surface of the recess 10. Light transmitting members 20 and 21 are installed in the base 15, and they are partially exposed from a cutout of the base 15 to the upper and lower inside surfaces 10B and 10A of the recess 10, respectively. That is, exposed portions of the light transmitting members 20 and 21 constitute the light receiving portions J and the light emitting portions H.

Figure 5:
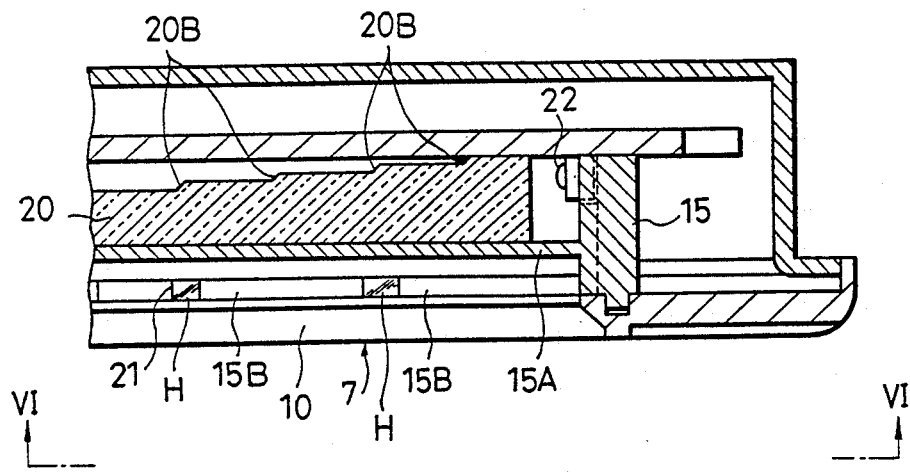
FIG. 5 is a cross section taken along the line V—V in FIG. 3.
Figure 6:
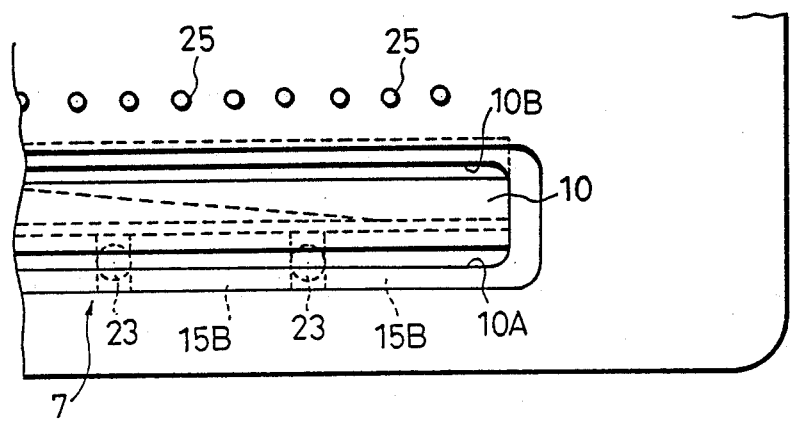
FIG. 6 is a view taken along the line VI—VI in FIG. 5.

As shown in FIGS. 3 to 5, the light transmitting member 20 on the light receiving side is of a substantially quadrangular configuration extending along the length of the recess 10. The light transmitting member 20 has a frontward projecting portion 20A formed at its lower surface with the light receiving portions J. The light transmitting member 20 is formed of a transparent material such as acrylic resin or glass. As best shown in FIG. 4, a pair of photo detectors 22 (one of which is shown) are provided at opposite ends of the light transmitting member 20 so as to receive the light transmitted through the light transmitting member 20.

As shown in FIGS. 4 and 5, the light transmitting member 20 has a stepped back surface formed with a plurality of stepped portions each constituting a reflective surface 20B for reflecting the light transmitted from each light emitting portion H to the photo detectors 22. The reflective surfaces 20B have different inclined angles becoming steeper as they approach closer to the photo detector 22. The frontward projecting portion 20A of the light transmitting member 20 is formed at its upper front end with a reflective surface 20C for reflecting the light received by the light receiving portions J to the reflective surfaces 20B. With this structure, the light beams emitted from the plural light emitting portions H are received by only the two photo detectors 22.

The light transmitting members 21 on the light emitting side are formed of a transparent material, and each member 21 is of an L-shaped configuration. As shown in FIG. 4, they are arranged in equally spaced relationship to each other along the length of the recess 10, and are maintained under light shielding condition by light shielding walls 15B frontwardly projecting from the base 15 (See FIGS. 3, 5 and 6). Each light transmitting member 21 has a frontward projecting portion 21A exposed at its upper surface to the lower inside surface of the recess 10. Such an exposed portion of the projecting portion 21A constitutes each light emitting portion H.

A plurality of infrared light emitting diodes (LEDs) 23 as light sources for supplying the light to the light emitting portions H are provided on the rear side of the light transmitting members 21, so that the light emitted from each LED 23 may be reflected on the reflective surface 21B of each light transmitting member 21 and may be transmitted from each light emitting portion H to each light receiving portion J. The LEDs 23 are so provided as to correspond to the light emitting portions H and generate pulse lights having different phases to be controlled by a light emission control means which will be hereinafter described.

The light transmitting members 20 and 21 are partitioned by a partition wall 15C of the base 15, so as to prevent leakage of the light from the light transmitting member 20 to the light transmitting member 21. Further, each wall of the base 15 surrounding the light transmitting members 20 and 21 is finished by plating in such a color as to absorb very little of the light (e.g., a white or specular surface).

Figure 7:
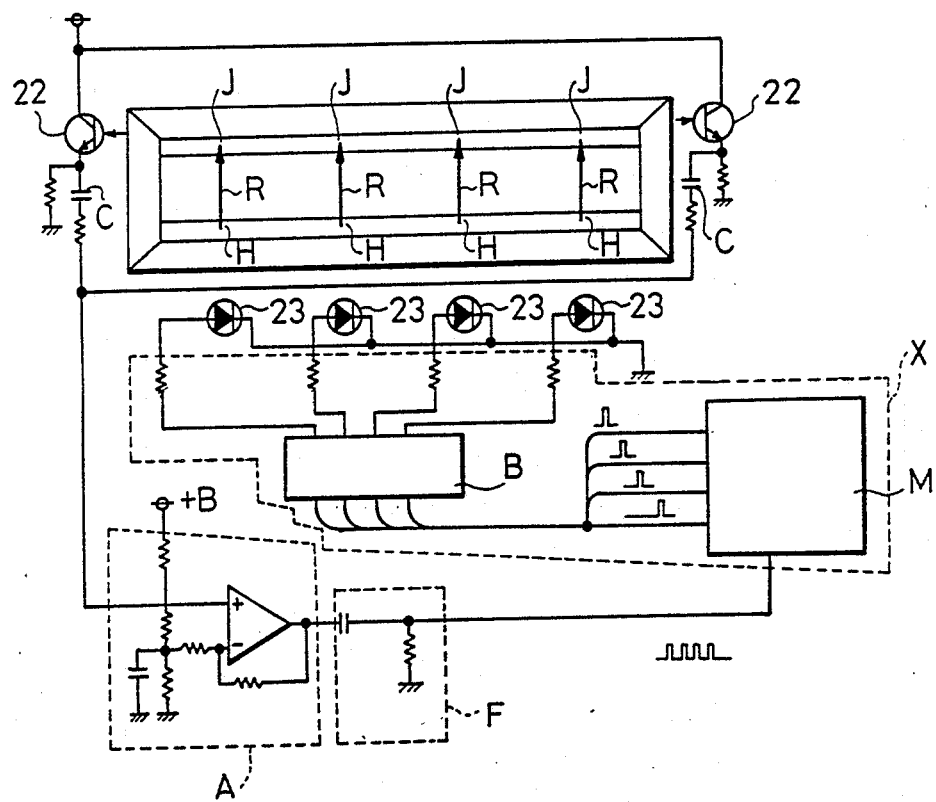
FIG. 7 is a circuit diagram of the tone control operating section shown in FIG. 2.
Figure 8:
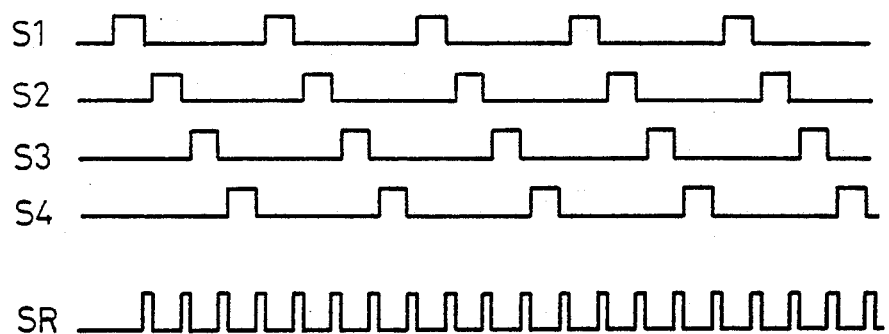
FIG. 8 is a timing chart of input and output signals of a microcomputer shown in FIG. 7.

Referring next to FIGS. 7 and 8, a light emission control means X comprises a microcomputer M for generating pulse signals different in phase for every LED 23 and a buffer B for supplying current to each LED 23 according to the pulse signals generated from the microcomputer M. That is, when the microcomputer M generates the pulse signals S1–S4 having different phases for every LED 23, the buffer B supplies pulse current to each LED 23 to emit pulsed infrared lights from the LEDs 23. The pulsed infrared lights emitted from the LEDs 23 are received by the light receiving portions J, and are reflected in the light transmitting member 20 to reach the photo detectors 22. Then, the infrared lights received by the photo detectors 22 are converted into current. At this time, ambient light is also received by the photo detectors 22 to cause an increase in current to be output from the photo detectors 22. To eliminate the influence of the ambient light, a direct current due to the ambient light is cut off by capacitors C to take out the current converted from the infrared lights only. Thereafter, the current is amplified by an amplifier A, and noise is cut off by a high pass filter F to obtain a pulse signal SR as shown in FIG. 8. Then, the pulse signal is input to the microcomputer M.

The microcomputer M includes means for determining whether or not the pulse signal is input thereto. According to the result of determination, the microcomputer M controls a variable resistor or an electronic volume in a tone control circuit to thereby select a tone level.

In the case that the condition of blocking the left light path R shown in FIG. 2 is changed into the condition of blocking the right light path, the tone is proportionally changed. A plurality of light emitting elements 25 for indicating different tone levels are arranged in a line on the operation panel 1. In accordance with the change in blocked condition of the light path R, one of the light emitting elements 25 is turned on according to a desired tone level. In operation, a main switch is turned on to bring the tape player into an operating condition. Then, a finger or the like is inserted into the recess 10 of the operating section 7, and is moved to a position of a desired tone level. Accordingly, the light path R at this position is blocked with the result that the light does not reach the corresponding photo detector 22. As a result, the pulse signal supplied to the LED 23 corresponding to the light path R is not returned to the microcomputer M. Then, the microcomputer M determines that the pulse signal has not been returned thereto and controls the tone level accordingly.

Thus, the tone control operating section 7 may be easily operated by only moving a finger. Further, since no mechanical operational parts are provided, the tone control operation may be made stable to increase the life of the system.

Although the operating structure is applied only to the tone control operating section in the above described embodiment, it is, as is obvious to those skilled in the art, applicable to a volume control section and a balance control section of a piece of audio equipment.

Further, although the two photo detectors 22 are provided to receive the light supplied to the plural light receiving portions J in the above preferred embodiment, a single photo detector or a plurality of photo detectors for every light receiving portion J may be provided. Further, only a single LED 23 may be provided, and a plurality of photo detectors for every light receiving portion J may be provided.

In the case that the LEDs 23 and the photo detectors 22 are provided for every light emitting portion H and every light receiving portion J, the pulses to be intermittently generated by the light emission control means may be different in phase for every LED, or may be made same in phase for every LED.

Further, the light emitting portions H may each be identified with one of the LEDs, and the light receiving portions J may each be identified with one of the photo detectors.

Figure 12:
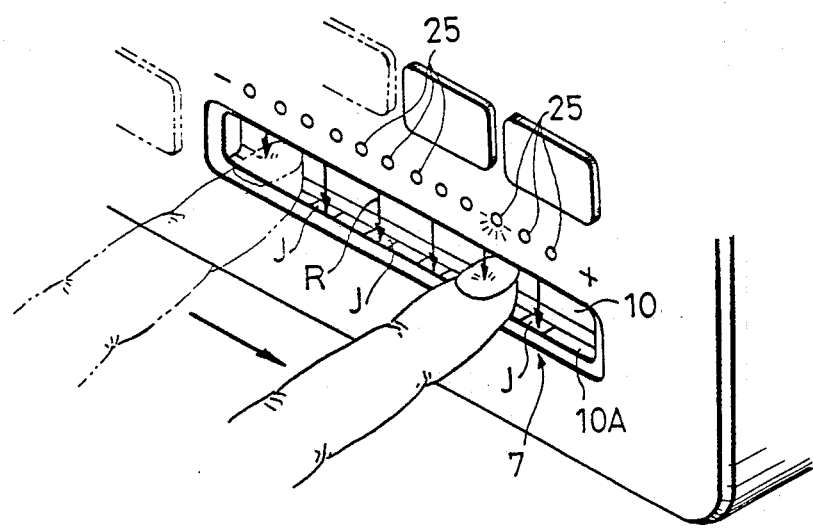
FIG. 12 is a perspective view of a further embodiment of the present invention.

Although the light emitting portions H are provided on the lower side of the recess 10, and the light receiving portions J are provided on the upper side of the recess 10 in the above described embodiment, the light emitting portions H may be provided on the upper side of the recess 10, and the light receiving portions J may be provided on the lower side of the recess 10 as shown in FIG. 12 illustrating a second preferred embodiment. Furthermore, in the case that the light emitting portions H are each identified with one of the light sources, the light emitting portions and the light receiving portions may be arranged alternately. In any case, it is sufficient to provide plural pairs of the light emitting portions H and the light receiving portions J arranged along the length of the recess 10.

Figure 10:
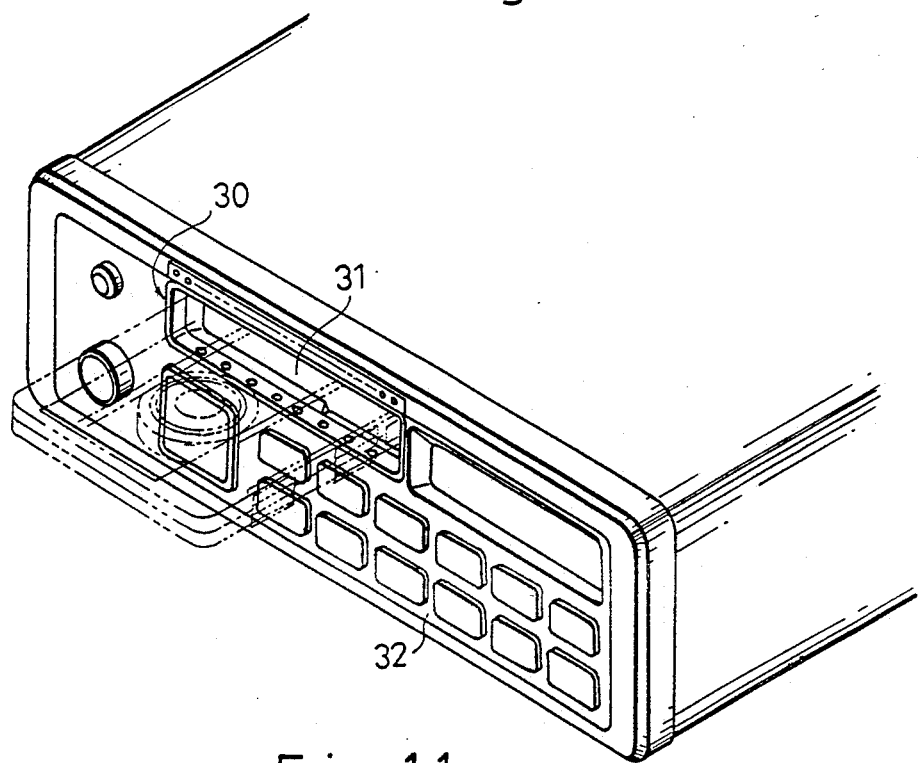
FIG. 10 is a perspective view of another preferred embodiment of the present invention.
Figure 11:
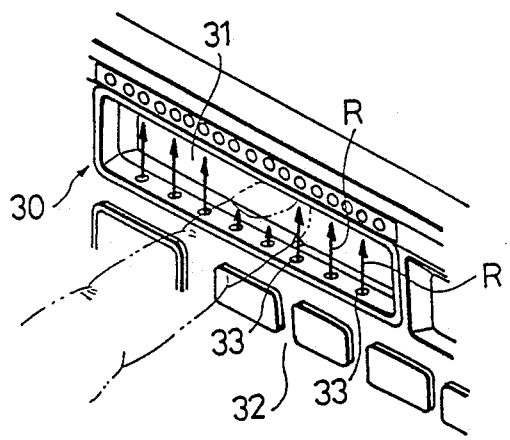
FIG. 11 is a perspective view of the operation of the tone control operating section shown in FIG. 10.

Referring to FIGS. 10 and 11 which shows a third embodiment of the present invention, reference numeral 30 designates a tone control operating section provided around a cassette insert opening 31. The cassette insert opening 31 is formed on an operation panel 32, and it acts as the recess 10 mentioned in the previous embodiments.

As shown in FIG. 11, a plurality of light emitting portions 33 are provided on the lower inside surface of the cassette insert opening 31, and they also act as the light sources. A plurality of light receiving portions (not shown) are provided on the upper inside surface of the cassette insert opening 31, and they also act as the photo detectors. Thus, the light paths R are formed in spaced relationship to each other in the longitudinal direction of the cassette insert opening 31 in the same manner as of the previous embodiments. In the third embodiment, since all the light paths R are blocked upon insertion of a cassette through the cassette insert opening 31, such blocking of the light paths R is distinguished from a blocking operation by a finger.

Although the cassette insert opening 31 acts as the recess of the tone control operating section in the third embodiment, any hole to be formed on the operation panel may constitute the recess according to the present invention.

Further, the straight recess as mentioned in the previous preferred embodiments may be replaced by a curved recess such as an annular recess.

Although the present invention is applied to a tape player in the above described embodiments, it is applicable to any other audio systems or electronic equipment or to any electrical or electronic device having a manual control.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:

1. An apparatus for optically detecting the location of a control object applied to a control panel, comprising:
   a recess formed on said control panel for receiving said control object;
   a plurality of light receiving portions formed on a first inside surface of said recess and arranged in a longitudinal direction of said recess;
   a plurality of light emitting portions formed on a second inside surface of said recess opposed to said first inside surface, each light emitting portion located opposite a corresponding one of each of the light receiving portions so as to emit light to the opposite light receiving portion, whereby a plurality of light paths pass from said light emitting portions across said recess to said light receiving portions, said light paths being arranged in the longitudinal direction of said recess;
   a light generator for supplying the light to each light emitting portion;
   a detector connected to said light receiving portions for generating a signal in response to the light emitted from said light emitting portions and received by said light receiving portions; and
   a light transmitting member connected to said light receiving portions, said light transmitting member having a back surface with a plurality of stepped portions corresponding to said light receiving portions, wherein the light received by said light receiving portions is reflected by said stepped portions and is transmitted through said light transmitting member to said detector.

2. An apparatus for optically detecting the location of a control object applied to a control panel, comprising:
   a recess formed on said control panel for receiving said control object;
   a plurality of light receiving portions formed on a first inside surface of said recess and arranged in a longitudinal direction of said recess;
   a plurality of light emitting portions formed on a second inside surface of said recess opposed to said first inside surface, each light emitting portion located opposite a corresponding one of each of the light receiving portions so as to emit light to the opposite light receiving portion, whereby a plurality of light paths pass from said light emitting portions across said recess to said light receiving portions, said light paths being arranged in the longitudinal direction of said recess;
   a light generator for supplying the light to each light emitting portion;
   light emission control means for controlling said light generator to generate the light in pulses; and a detector connected to said light receiving portions for generating a signal in response to the light emitted from said light emitting portions and received by said light receiving portions.

3. The apparatus of claim 2 further comprising indicator means provided adjacent to said recess for indicating the predetermined signal.

4. The apparatus of claim 2 wherein said recess comprises a recording medium insert opening.

5. The apparatus of claim 2, wherein said light emitting portions are provided on a lower inside surface of said recess, and said light receiving portions are provided on an upper inside surface of said recess.

6. The apparatus of claim 2, wherein said light generator comprises a light source provided for each light emitting portion, and each light source is controlled by said light emission control means in such a manner that the phases of said pulses of light for each of said light sources are different from each other.

7. The apparatus of claim 6, wherein said light emission control means comprises:
means for generating a pulse signal for each of said light sources; and
means for supplying current to said light sources according to said respective pulse signals generated from said pulse signal generating means.

8. The apparatus of claim 6, wherein said detector comprises:
a photo detector; and
a light transmitting member connected to said light receiving portions, said light transmitting member having a back surface with a plurality of stepped portions corresponding to said light emitting portions, wherein the light emitted from said light emitting portions is reflected by said stepped portions, and is transmitted through said light transmitting member to said photo detector.

9. The apparatus of claim 6, wherein said detector comprises:
a single photo detector; and
a light transmitting member connected to said light receiving portions, said light transmitting member having a stepped back surface formed so as to transmit the light emitted from said light emitting portions to said single photo detector.

10. An apparatus for optically detecting the location of a control object applied to a control panel, comprising:
a recess formed on said control panel for receiving said control object;
a plurality of light receiving portions formed on a first inside surface of said recess and arranged in a longitudinal direction of said recess;
a plurality of light emitting portions formed on a second inside surface of said recess opposed to said first inside surface, each light emitting portion corresponding to a light receiving portion so as to emit light to each opposite light receiving portion, whereby a plurality of light paths pass from said light emitting portions across said recess to said light receiving portions, said light paths being arranged in the longitudinal direction of said recess;
a single light source for supplying the light to each light emitting portion;
light emission control means for controlling said light source so as to generate the light in pulses; and
a plurality of photo detectors each connected to a light receiving portion for generating a signal in response to the light emitted from said light emitting portions and received by said light receiving portions.

11. An apparatus for optically detecting the location of a control object applied to a control panel, comprising:
a recess formed on said control panel for receiving said control object;
a plurality of light receiving portions formed on a first inside surface of said recess and arranged in a longitudinal direction thereof;
a plurality of light emitting portions formed on a second inside surface of said recess opposed to said first inside surface, each light emitting portion located opposite a corresponding one of each of the light receiving portions so as to emit light to the opposite light receiving portion, whereby a plurality of light paths pass from said light emitting portions across said recess to said light receiving portions, said light paths being arranged in the longitudinal direction of said recess;
a light generator for supplying the light to each light emitting portion;
a detector connected to said light receiving portions for generating a signal in response to the light emitted from said light emitting portions and received by said light receiving portions; and
a light transmitting member connected to said light emitting portions, said light transmitting member having a back surface with a plurality of stepped portions corresponding to said light emitting portions, wherein the light emitted from said light generator is reflected by said stepped portions and is transmitted through said light transmitting member to said light emitting portions.

12. The apparatus of claim 11, wherein said light generator comprises a single light source.

13. A method of optically controlling a device, comprising the steps of:
pulsing a plurality of light sources;
emitting the light from said light sources into a planar region generally parallel to a surface of a control panel in a plurality of generally parallel beam paths, said light being emitted from an edge of said planar region;
selectively positioning a control object within said planar region with movement transverse to said beam paths, said control object blocking at least one of said beam paths;
detecting at the opposing edge of said planar region light present on said beam paths;
identifying said blocked beam path in accordance with the results of said detecting step; and
controlling said device in accordance with the results of said identifying step.

14. A method as in claim 13,
wherein said pulsing step comprises the steps of pulsing each of said light sources with a unique phase relative to the other light sources;
wherein said detecting step comprises the steps of converging said beam paths onto at least one point; and converting any light present at said at least one point into an electrical signal; and
wherein said identifying step comprises the step of processing said electrical signal to identify said blocked beam path as a function of phase information present in said electrical signal.

15. A method as in claim 14, wherein:

said converging step comprises converging half of said beam paths onto a first point, and the other half of said beam paths onto a second point; and said converting step comprises converting any light present at said first and second points into second and third electrical signals, and combining said second and third electrical signals to obtain said first-mentioned electrical signal.

16. A method of optically controlling a device, comprising the steps of:

pulsing a light source;

diverging the light from said light source into a plurality of light beams;

directing said light beams into a planar region generally parallel to a surface of a control panel in a plurality of generally parallel beam paths, said light being emitted from an edge of said planar region;

selectively positioning a control object within said planar region with movement transverse to said beam paths, said control object blocking at least one of said beam paths;

detecting at the opposing edge of said planar region light present on said beam paths;

identifying said blocked beam path in accordance with the results of said detecting step; and controlling said device in accordance with the results of said identifying step.

* * * * *